United States Patent
Wang et al.

(10) Patent No.: US 10,956,706 B2
(45) Date of Patent: Mar. 23, 2021

(54) COLLECTING FINGREPRINTS

(71) Applicant: Beijing Xiaomi Mobile Software Co., Ltd., Beijing (CN)

(72) Inventors: Di Wang, Beijing (CN); Ju Tang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/420,240

(22) Filed: May 23, 2019

(65) Prior Publication Data

US 2019/0370526 A1 Dec. 5, 2019

(30) Foreign Application Priority Data

May 31, 2018 (CN) .......................... 201810555871.8
Jul. 27, 2018 (CN) .......................... 201810847110.X

(51) Int. Cl.
*G06K 9/00* (2006.01)
*G06F 3/041* (2006.01)
(Continued)

(52) U.S. Cl.
CPC ............. *G06K 9/0004* (2013.01); *G01C 9/00* (2013.01); *G01J 1/4204* (2013.01); *G06F 3/041* (2013.01);
(Continued)

(58) Field of Classification Search
CPC ............. G06K 9/0004; G06K 9/00087; G06K 9/00013; G06K 9/036; G06K 9/00912;
(Continued)

(56) References Cited

U.S. PATENT DOCUMENTS

2005/0123177 A1* 6/2005 Abiko ................ G06K 9/00114
382/124
2014/0176332 A1* 6/2014 Alameh .................. G06F 21/32
340/665
(Continued)

FOREIGN PATENT DOCUMENTS

CN    103179271 A    6/2013
CN    105260105 A    1/2016
(Continued)

OTHER PUBLICATIONS

Combined Chinese Office Action and Search Report dated Sep. 27, 2019 in Chinese Patent Application No. 201810847098.2 (with unedited computer generated English translation and English translation of Category of Cited Documents), 16 pages.
(Continued)

*Primary Examiner* — Premal R Patel
(74) *Attorney, Agent, or Firm* — Oblon, McClelland, Maier & Neustadt, L.L.P.

(57) ABSTRACT

The disclosure relates to a method, electronic device, and non-transitory computer-readable medium for collecting fingerprints. The method includes detecting a touch operation on a fingerprint region; when the touch operation on the fingerprint region is detected, detecting a touch signal within the fingerprint region as a first touch signal; comparing the first touch signal with a preset report threshold to obtain a first comparison result; determining whether a fingerprint image on the fingerprint region is acquired based on the first comparison result; when the fingerprint image is acquired, analyzing the fingerprint image to obtain an analysis result; and outputting a prompt based on the analysis result.

14 Claims, 13 Drawing Sheets

(51) Int. Cl.
　　　*G06Q 20/40*　　　(2012.01)
　　　*G01C 9/00*　　　(2006.01)
　　　*G01J 1/42*　　　(2006.01)
　　　*G09G 5/10*　　　(2006.01)

(52) U.S. Cl.
　　　CPC ..... *G06F 3/04146* (2019.05); *G06K 9/00087* (2013.01); *G06Q 20/40145* (2013.01); *G09G 5/10* (2013.01); *G09G 2320/0606* (2013.01); *G09G 2320/0626* (2013.01); *G09G 2354/00* (2013.01); *G09G 2360/144* (2013.01)

(58) Field of Classification Search
　　　CPC .......... G01C 9/00; G01J 1/4204; G06F 3/041; G06F 3/04146; G06F 2203/04105; G06F 3/041661; G06F 3/0488; G06F 21/32; G06F 3/0484; G06F 3/04847; G09G 5/10; G09G 2320/0606; G09G 2320/0626; G09G 2354/00; G09G 2360/144; G09G 2358/00; G06Q 20/40145; G06Q 20/32
　　　See application file for complete search history.

(56) References Cited

U.S. PATENT DOCUMENTS

| | | | | |
|---|---|---|---|---|
| 2016/0171281 | A1* | 6/2016 | Park | G06K 9/00087 382/124 |
| 2017/0255269 | A1* | 9/2017 | Yang | G06F 3/041 |
| 2017/0270335 | A1 | 9/2017 | Evans, V et al. | |
| 2017/0316250 | A1* | 11/2017 | Roh | H04M 1/72519 |
| 2017/0372122 | A1* | 12/2017 | Shim | G06K 9/0002 |
| 2018/0053029 | A1 | 2/2018 | Jiang et al. | |
| 2018/0218195 | A1* | 8/2018 | Sheik-Nainar | G06K 9/00013 |
| 2018/0314874 | A1* | 11/2018 | Yang | G06F 3/0487 |
| 2018/0329560 | A1* | 11/2018 | Kim | G06F 3/0414 |
| 2019/0065808 | A1 | 2/2019 | Zhang et al. | |
| 2019/0213384 | A1* | 7/2019 | Lu | G06F 3/0488 |
| 2019/0244007 | A1* | 8/2019 | Bach | G06K 9/00087 |
| 2019/0303549 | A1* | 10/2019 | Tanabe | G06F 21/32 |

FOREIGN PATENT DOCUMENTS

| | | |
|---|---|---|
| CN | 106022073 A | 10/2016 |
| CN | 106127012 A | 11/2016 |
| CN | 106326711 A | 1/2017 |
| CN | 106503516 A | 3/2017 |
| CN | 106652922 A | 5/2017 |
| CN | 106886703 A | 6/2017 |
| CN | 107122748 A | 9/2017 |
| CN | 107193363 A | 9/2017 |
| CN | 107566635 A | 1/2018 |
| CN | 107765774 A | 3/2018 |
| CN | 107809536 A | 3/2018 |
| CN | 108021318 A | 5/2018 |
| CN | 108024017 A | 5/2018 |
| EP | 3 211 514 A1 | 8/2017 |
| EP | 3 239 897 A1 | 11/2017 |
| EP | 3 285 205 A1 | 2/2018 |
| EP | 3 299 947 A1 | 3/2018 |
| WO | WO 2017/107419 A1 | 6/2017 |

OTHER PUBLICATIONS

Extended European Search Report dated Oct. 24, 2019 in European Patent Application No. 19177671.5, 7 pages.
Combined Chinese Office Action dated Mar. 4, 2020, in Patent Application No. 201810847116.7, 16 pages (with unedited computer generated English translation).
Combined Chinese Office Action dated Mar. 4, 2020, in Patent Application No. 201810713761.X, 14 pages (with unedited computer generated English translation).
Chinese Office Action dated Sep. 29, 2020 in Chinese Patent Application No. 201810847116.7 (with unedited computer generated English translation), 16 pages.
Chinese Office Action dated Jun. 8, 2020 in corresponding Chinese Patent Application No. 201810847098.2 (with English Translation), 13 pages.
Chinese Office Action dated Oct. 28, 2020 in Chinese Patent Application No. 201810847098.2 (with English machine translation), 18 pages.
Combined Chinese Office Action and Search Report dated Nov. 10, 2020 in Patent Application No. 201810713761.X (with English machine translation and English translation of Category of Cited Documents), 15 pages.

* cited by examiner

COLLECTING FINGREPRINTS

CROSS-REFERENCE TO RELATED APPLICATIONS

This application is based on and claims priority to Chinese Patent Application No. 201810847110.X filed on Jul. 27, 2018 and Chinese Patent Application No. 201810555871.8 filed on May 31, 2018, the entire contents of which are incorporated herein by reference.

TECHNICAL FIELD

The present disclosure relates to the technical field of security, and more particularly to a method and device for collecting fingerprints.

BACKGROUND

With the continuous development of fingerprint identification technology, the fingerprint identification methods of electronic devices are also developed continuously. Methods of identifying fingerprints from a user's swiping and/or pressing actions (e.g., capacitive fingerprint identification) may be integrated into an in-display fingerprint identification system in order to improve the appearance of the electronic devices and reduce external components of the electronic devices.

The in-display fingerprint identification system may be configured to acquire a fingerprint image by using light or ultrasonic waves penetrating the screen of the electronic device. When using light to acquire the fingerprint image, optical signals are provided based on the self-luminescence of an organic light-emitting diode (OLED) screen.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method of collecting fingerprints. The method includes detecting a touch operation on a fingerprint region; when the touch operation on the fingerprint region is detected, detecting a touch signal within the fingerprint region as a first touch signal; comparing the first touch signal with a preset report threshold to obtain a first comparison result; determining whether a fingerprint image on the fingerprint region is acquired based on the first comparison result; when the fingerprint image is acquired, analyzing the fingerprint image to obtain an analysis result; and outputting a prompt based on the analysis result.

According to an aspect, when determining whether the fingerprint image on the fingerprint region is acquired, the method further includes detecting a pressure value for the touch operation; comparing the pressure value with a preset pressure threshold to obtain a second comparison result; and determining whether the fingerprint image on the fingerprint region is acquired based on the first comparison result and the second comparison result.

According to another aspect, when analyzing the fingerprint image, the method further includes analyzing a quality of the fingerprint image based on a parameter to obtain the analysis result, wherein the parameter includes one or more of a gray mean value, a gray variance, an effective area, and a singular point of the fingerprint image. Furthermore, when outputting the prompt, the method further includes outputting a touch qualification prompt when the analysis result satisfies a preset condition.

According to yet another aspect, when outputting the prompt, the method further includes outputting a touch adjustment prompt when the analysis result does not satisfy the preset condition; and receiving an adjusted touch operation on the fingerprint region based on the touch adjustment prompt.

According to yet another aspect, the method further includes, when the fingerprint image on the fingerprint region is acquired, controlling a screen to enter a high brightness mode, wherein the fingerprint region is included in the screen.

According to yet another aspect, when outputting the prompt, the method further includes at least one of playing a prompt animation, displaying text prompt information, playing voice prompt information, and outputting a vibration prompt.

According to yet another aspect, the method further includes identifying the fingerprint image to obtain an identification result; and initiating at least one of an unlocking operation and a payment operation based on the identification result.

According to yet another aspect, when detecting the pressure value for the touch operation, the method further includes detecting the pressure value for the touch operation based on the first comparison result.

According to yet another aspect, the method includes, when the touch operation on the fingerprint region is detected, detecting a touch signal outside the fingerprint region as a second touch signal; comparing the second touch signal with the preset report threshold; when the first touch signal is greater than or equal to the preset report threshold and the second touch signal is less than the preset report threshold: controlling a screen to enter a high brightness mode, wherein the fingerprint region is included in the screen; and acquiring the fingerprint image on the fingerprint region.

According to yet another aspect, when the first touch signal is greater than or equal to the preset report threshold and the second touch signal is less than the preset report threshold, and when controlling the screen to enter the high brightness mode, the method further includes detecting a pressure value for the touch operation; and when the pressure value is greater than or equal to a preset pressure threshold, controlling the screen to enter the high brightness mode.

According to yet another aspect, when the pressure value is greater than or equal to the preset pressure threshold, and when controlling the screen to enter the high brightness mode, the method further includes detecting whether there is a block within a preset distance threshold from the screen; and when there is no block within the preset distance threshold from the screen, controlling the screen to enter the high brightness mode.

According to yet another aspect, the method further includes when the touch operation on the fingerprint region is detected, detecting a touch coordinate for the touch operation; when the first touch signal is greater than or equal to the preset report threshold and the touch coordinate is within a coordinate range of the fingerprint region, obtaining a touch area for the touch operation; when the touch area is within a preset area range: controlling a screen to enter a high brightness mode, wherein the fingerprint region is included in the screen; and acquiring the fingerprint image on the fingerprint region.

According to yet another aspect, when initiating at least one of the unlocking operation and the payment operation based on the identification result, the method further includes: when the identification result indicates a successful match, displaying a first control and a second control; when a first instruction generated by the first control is detected, unlocking a screen, wherein the fingerprint region is included in the screen; and when a second instruction generated by the second control is detected: unlocking the screen and performing the payment operation, or keeping the screen locked and performing the payment operation.

Aspects of the disclosure also provide an electronic device including a processor and a memory for storing instructions executable by the processor. The processor is configured to detect a touch operation on a fingerprint region; when the touch operation on the fingerprint region is detected, detect a touch signal within the fingerprint region as a first touch signal; compare the first touch signal with a preset report threshold to obtain a first comparison result; determine whether a fingerprint image on the fingerprint region is acquired based on the first comparison result; when the fingerprint image is acquired, analyze the fingerprint image to obtain an analysis result; and output a prompt based on the analysis result.

Aspects of the disclosure also provide a non-transitory computer-readable storage medium storing instructions that, when executed by one or more processors of a device, cause the device to detect a touch operation on a fingerprint region; when the touch operation on the fingerprint region is detected, detect a touch signal within the fingerprint region as a first touch signal; compare the first touch signal with a preset report threshold to obtain a first comparison result; determine whether a fingerprint image on the fingerprint region is acquired based on the first comparison result; when the fingerprint image is acquired, analyze the fingerprint image to obtain an analysis result; and output a prompt based on the analysis result.

It is to be understood that both the foregoing general description and the following detailed description are illustrative and explanatory only and are not restrictive of the present disclosure.

BRIEF DESCRIPTION OF DRAWINGS

The accompanying drawings, which are incorporated in and constitute a part of this specification, illustrate aspects consistent with the disclosure and, together with the description, serve to explain the principles of the disclosure.

Figure 1:
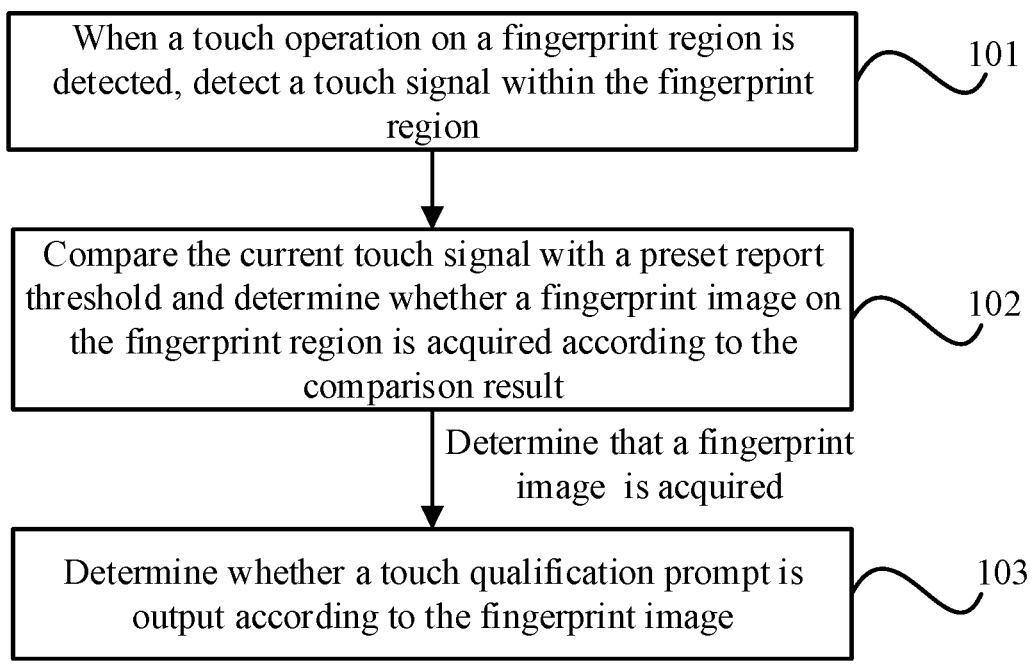
FIG. 1 is a flowchart of a method of collecting fingerprints according to an exemplary aspect of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of illustrative aspects do not represent all implementations consistent with the disclosure. Instead, they are merely examples of apparatuses and methods consistent with aspects related to the disclosure as recited in the appended claims.

The term used in the present disclosure is for the purpose of describing particular examples only and is not intended to limit the present disclosure. As used in this disclosure and the appended claims, the singular forms "a," "an" and "the" are intended to include the plural forms as well, unless the context clearly indicates otherwise. It should also be understood that the term "and/or" as used herein refers to and includes any and all possible combinations of one or more of the associated listed items.

It shall be understood that, although the terms "first," "second," "third," and the like may be used herein to describe various information, the information should not be limited by these terms. These terms are only used to distinguish one category of information from another. For example, without departing from the scope of the present disclosure, first information may be referred as second information; and similarly, second information may also be referred as first information. As used herein, the term "if" may be interpreted as "when" or "upon" or "in response to determining" depending on the context.

When the capacitive fingerprint identification manner is used, the acquisition time of the fingerprint image is shorter, for example, shorter than 50 ms. In the in-display fingerprint identification manner, the fingerprint image is acquired by the optical principle, and the acquisition time of the fingerprint image may be about 100 ms longer than the acquisition time of the fingerprint image in the capacitive fingerprint identification manner. When the user uses the capacitive fingerprint identification manner for a long time, a habit to keep the touch operation for a relatively short time is formed. In this case, when using the in-display fingerprint identification manner, since the user is accustomed to keeping the touch operation for a relatively short time, an in-display fingerprint identification configuration in the electronic device does not have enough time to acquire the fingerprint image, thereby causing that the electronic device cannot respond to the unlocking or payment operation of the finger, such that the user experience is relatively poor; or causing that the acquired fingerprint image is unclear, such that the fingerprint collection efficiency is decreased.

In addition, in an off-screen mode, that is, no pixel in the screen is lit up or illuminated, when the user holds or picks up the electronic device, the hand touches the screen and a touch operation is correspondingly generated, even if the user is not desired to unlock the electronic device, but the electronic device still determine that the electronic device needs to be unlocked and thus the screen is lit up, thereby causing that the screen is lit up too frequently or is always on, in this case, the display is easy to burn.

Furthermore, the electronic device, such as a mobile phone, a tablet and so on, may automatically adjust the brightness of the screen according to the change of the brightness of the ambient light. When the user holds the electronic device horizontally, for example, both hands hold two ends of the electronic device and the screen is in a horizontal state at this time, such that the finger or wrist of the user covers a distance sensor or a light sensor of the electronic device, the electronic device still adjusts the screen brightness. That is, the screen brightness may also be adjusted when the brightness of the ambient light is unchanged. In this way, the screen brightness mis-adjustment phenomenon occurs, thereby causing that the accuracy of the screen brightness adjustment is low, affecting the user experience, and causing a certain energy consumption loss.

FIG. 1 is a flowchart of a method of collecting fingerprints according to an example of the present disclosure. The method may be applied in an electronic device and used to any scenarios, such as fingerprint entry, fingerprint unlocking, and fingerprint payment. The method includes the following steps 101-103.

At step 101, when a touch operation on a fingerprint region is detected, a touch signal within the fingerprint region is detected.

At step 102, the current touch signal is compared with a preset report threshold, and it is determined whether a fingerprint image on the fingerprint region is acquired according to the comparison result.

At step 103, it is determined whether a touch qualification prompt is output according to the fingerprint image.

At step 101, the fingerprint region refers to a region in the screen corresponding to a fingerprint identification configuration in the electronic device. When the user presses the fingerprint region, a fingerprint image may be acquired. The touch operation may be generated by pressing the fingerprint region with the finger when the user uses the electronic device to perform fingerprint entry, fingerprint unlocking or fingerprint payment. The touch operation is detected by a touch sensor in the touch screen of the electronic device. The touch signal may be detected by a touch detecting configuration, such as the touch screen, of the electronic device. In an example, the touch signal within the fingerprint region is 500.

At step 102, the report threshold may be pre-set by a developer in the development stage or set by the user according to his or her own usage, for example, the report threshold is 200. The comparison result includes two types. The first type indicates that the current touch signal is greater than or equal to the preset report threshold. The second indicates that the current touch signal is less than the preset report threshold. When the touch signal is greater than or equal to the preset report threshold, it is determined that the fingerprint image on the fingerprint region is acquired. When the touch signal is less than the preset report threshold, it is determined that the fingerprint image on the fingerprint region is not acquired. In addition, when it is determined that the fingerprint image on the fingerprint region is acquired, the fingerprint image is acquired with the fingerprint identification configuration, such as an in-display fingerprint identification configuration corresponding to the fingerprint region of the electronic device.

At step 103, determining whether a touch qualification prompt is output according to the fingerprint image includes the following sub-steps 1031-1032.

At sub-step 1031, a quality of the fingerprint image is analysed based on a particular parameter to obtain an analysis result.

At sub-step 1032, when the analysis result satisfies a preset condition, the touch qualification prompt is output.

At sub-step 1031, the particular parameter includes one or more of a gray mean value, a gray variance, an effective area, and a singular point of the fingerprint image. The analysis result is a comprehensive score calculated based on the particular parameter and used to represent the comprehensive quality of the fingerprint image. How to obtain the analysis result according to the particular parameter is well-known from the related art and will not be described herein. The effective area of the fingerprint image refers to a ratio between an area of a foreground of the fingerprint image and an area of the fingerprint image.

At sub-step 1032, the preset condition is a preset qualified score threshold. The preset qualified score threshold indicates that if the analysis result of the fingerprint image is greater than the preset qualified score threshold, the clarity and information of the acquired fingerprint image is enough. In this case, the touch qualification prompt is output. The qualified score threshold may be obtained by the developer according to a comprehensive quality score corresponding to a fingerprint image which can be successfully entered during the fingerprint entry stage. In an example, in a case that 100 is full scores and 0 is the lowest score, the qualified score threshold is 70. Then, at step 103, a case that the analysis result satisfies the preset condition may be equivalent to a case that the comprehensive quality score is greater than or equal to the preset qualified score threshold.

In some examples, the particular parameter does not necessarily include all of the above parameters, for example, the particular parameter may include at least one of a gray mean value, a gray variance, an effective area, and a singular point of the fingerprint image. Correspondingly, when the particular parameter includes only one parameter of the fingerprint image, the analysis result may be directly expressed as the parameter value of the currently adopted particular parameter, without being transformed into a comprehensive quality score. The preset condition may be adjusted correspondingly according to the change of the definition of the analysis result. For example, when the analysis result is a parameter value, the preset condition is a parameter threshold; when the analysis result is a comprehensive quality score, then the preset condition is a preset qualified score threshold.

In some examples, the execution environment of step 101 and step 102 may be: the screen of the electronic device is in the off-screen mode, an Always on Display (AOD) mode and a normal display mode. In the off-screen mode, the entire screen is black and no pixel is lit up. In the AOD mode, the electronic device only keeps a limited portion of the screen on and is equivalent to a display mode with a low power consumption and a low refresh rate. In the normal display mode, all pixels in the screen are lit up. In a case that step 101 and step 102 are performed in the off-screen mode or the AOD mode, when it is determined that the fingerprint image on the fingerprint region is acquired, the screen is first controlled to enter the normal display mode, and then the fingerprint image is acquired. In a case that step 101 and step 102 are performed in the normal display mode, when it is determined that the fingerprint image on the fingerprint region is acquired, the normal display mode is maintained, and the fingerprint image is directly acquired. In some examples, in sub-step 1032, outputting the touch qualification prompt may include at least one of the following: playing a prompt animation, displaying text prompt information, playing voice prompt information, and outputting a vibration prompt.

Figure 2:
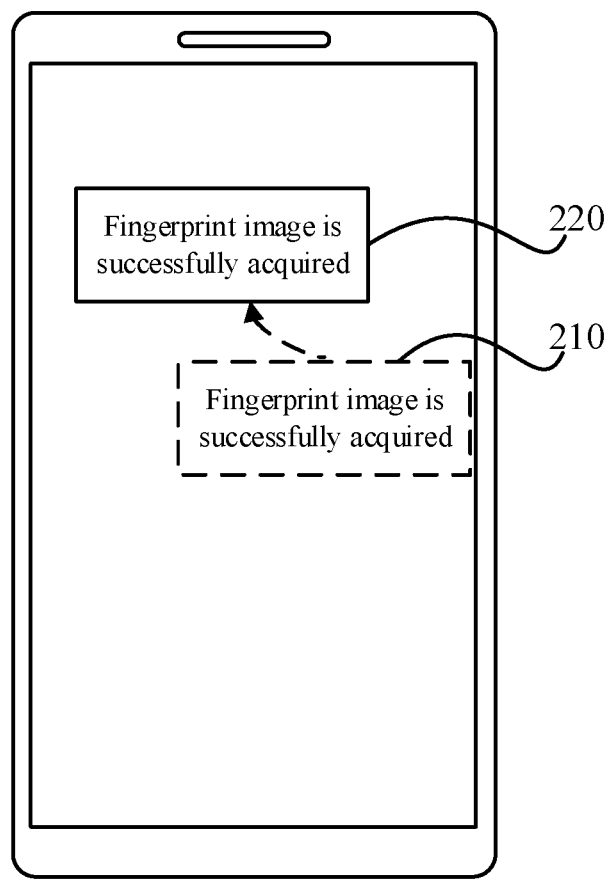
FIG. 2 is a schematic diagram of an interface in which the electronic device is playing a prompt animation according to an exemplary aspect of the present disclosure.

In some examples, the prompt animation may be played in a form in which a floating window, a floating text or a floating pattern is displayed on the touch screen of the electronic device, where a text content indicating that the fingerprint image is successfully acquired is displayed in any floating object. FIG. 2 is a schematic diagram of an interface in which the electronic device is playing a prompt animation according to an example of the present disclosure. As shown in FIG. 2, a floating window displaying "fingerprint image is successfully acquired" is moved from a position indicated by reference numeral 210 to a position indicated by reference numeral 220.

In some examples, the text prompt information may be displayed on the screen of the electronic device, and the display content in the text prompt information may be: "fingerprint image is successfully acquired."

In some examples, the voice prompt information may be played by a voice configuration of the electronic device, and the played voice content may be: "fingerprint image is successfully acquired, please release the finger."

In some examples, the vibration prompt may be output by a vibration configuration of the electronic device, for example, the vibration prompt is implemented by vibration generated by a motor of the electronic device. The vibration prompt may be continuously or intermittently output within a preset prompt time. The preset prompt time may be any value from 3 s to 10 s.

Therefore, in the present disclosure, it is determined whether the fingerprint image on the fingerprint region is acquired according to the touch signal, thereby avoiding that the electronic device responds to a false touch operation of the user to some extent; and it is determined whether a touch qualification prompt is output according to the fingerprint image to prompt the user whether the current pressing is valid, such that the user keeps the finger pressing the fingerprint region when the touch qualification prompt is not received by the user, thereby ensuring sufficient time to acquire the fingerprint image.

In an example, based on the above examples, before determining whether a fingerprint image on the fingerprint region is acquired according to the comparison result, the method of collecting fingerprints provided by the present disclosure may further include the following steps 201-202.

At step 201, a pressure value for the touch operation is detected.

At step 202, the pressure value is compared with a preset pressure threshold.

Where, the pressure value may be detected by a pressure sensor of the electronic device; and the pressure threshold may be obtained by the developer according to the relationship between the pressing pressure and the quality of the fingerprint image and is pre-stored in the electronic device.

Figure 3:
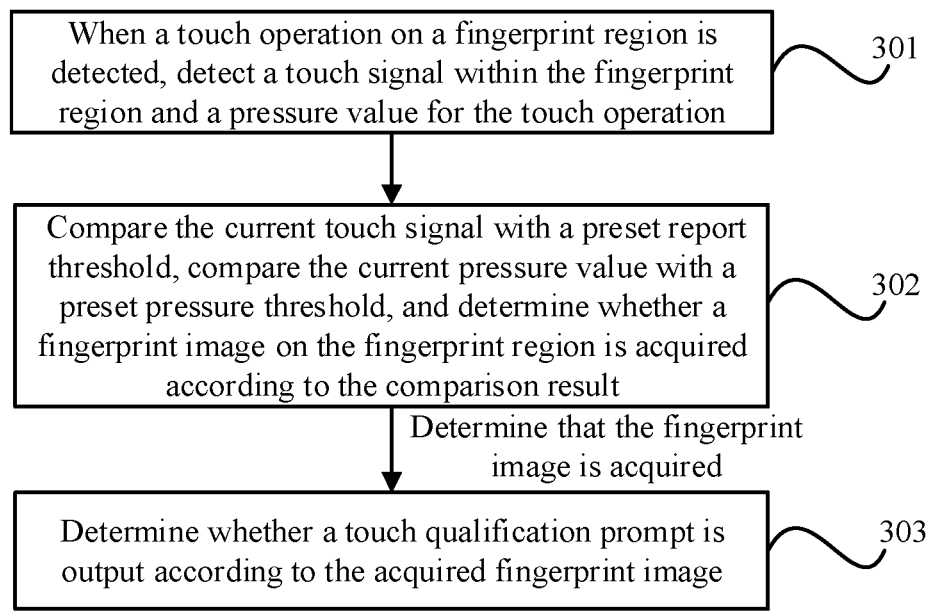
FIG. 3 is a flowchart of a method of collecting fingerprints according to an exemplary aspect of the present disclosure.

FIG. 3 is a flowchart of a method of collecting fingerprints according to an example of the present disclosure. Based on the above steps 201 and 202, the method of collecting fingerprints shown in FIG. 3 includes the following steps 301-303.

At step 301, when a touch operation on a fingerprint region is detected, a touch signal within the fingerprint region and a pressure value for the touch operation are detected.

At step 302, the current touch signal is compared with a preset report threshold, the current pressure value is compared with a preset pressure threshold, and it is determined whether a fingerprint image on the fingerprint region is acquired according to the comparison result.

At step 303, it is determined whether a touch qualification prompt is output according to the acquired fingerprint image.

The comparison result at the step 302 includes four types. The first type indicates that the current touch signal is greater than or equal to the report threshold and the current pressure value is greater than or equal to the pressure threshold. The second type indicates that the current touch signal is greater than or equal to the report threshold and the current pressure value is less than the pressure threshold. The third type indicates that the current touch signal is less than the report threshold and the current pressure value is less than the pressure threshold. The fourth type indicates that the current touch signal is less than the report threshold and the current pressure value is greater than or equal to the pressure threshold.

When the comparison result is the first type, it is determined that the fingerprint image on the fingerprint region is acquired. When the comparison result is the other three types except the first type, it is determined that the fingerprint image on the fingerprint region is not acquired. In addition, step 301 may be understood with reference to the above description of steps 101 and 201; and step 303 may be understood with reference to the above description of step 103. Further detail is omitted for brevity.

Figure 4:
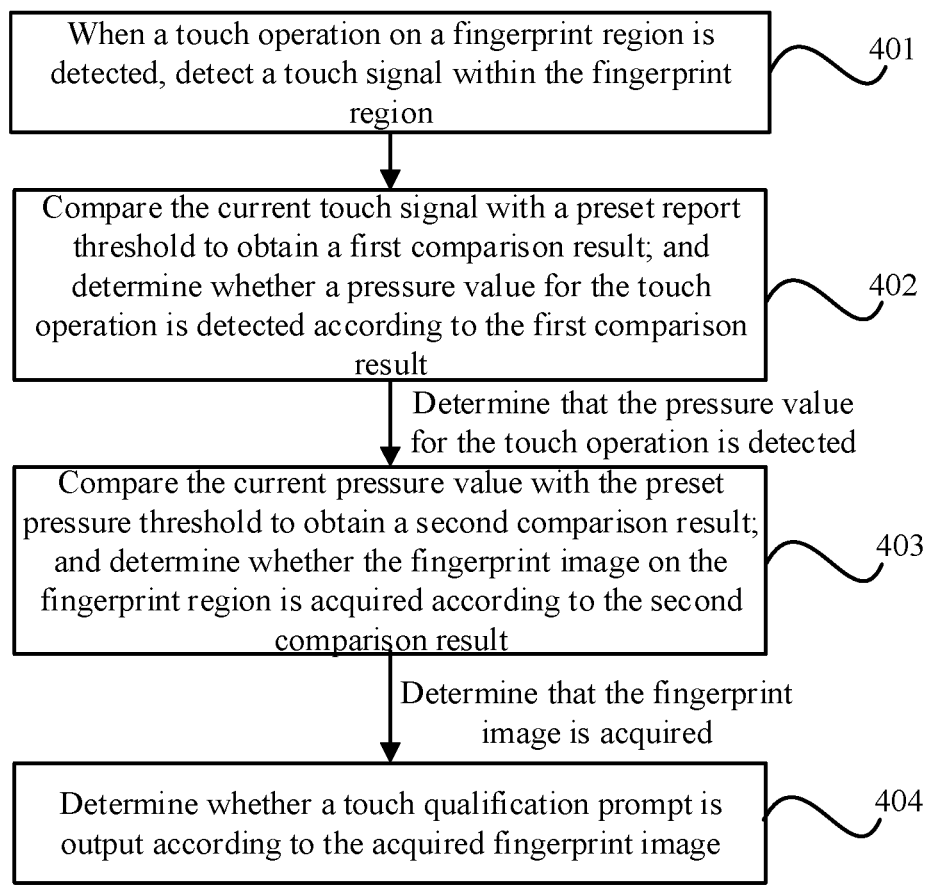
FIG. 4 is a flowchart of a method of collecting fingerprints according to an exemplary aspect of the present disclosure.

FIG. 4 is a flowchart of a method of collecting fingerprints according to an example of the present disclosure. Based on the above steps 201 and 202, the method of collecting fingerprints shown in FIG. 4 includes the following steps 401-404.

At step 401, when a touch operation on a fingerprint region is detected, a touch signal within the fingerprint region is detected.

At step 402, the current touch signal is compared with a preset report threshold to obtain a first comparison result; and it is determined whether a pressure value for the touch operation is detected according to the first comparison result.

At step 403, when it is determined that the pressure value for the touch operation is detected, the current pressure value is compared with the preset pressure threshold to obtain a second comparison result; and it is determined whether the fingerprint image on the fingerprint region is acquired according to the second comparison result.

At step 404, it is determined whether a touch qualification prompt is output according to the acquired fingerprint image.

At step 402, the first comparison result is the same as the comparison result in the above step 102. When the touch signal is greater than or equal to the report threshold, the pressure value for the touch operation is detected; and when the touch signal is less than the report threshold, the pressure value for the touch operation is not detected.

At step 403, the second comparison result includes two types. The first type indicates that the current pressure value is greater than or equal to the pressure threshold; and the second type indicates that the current pressure value is less than the pressure threshold. When the current pressure value is greater than or equal to the pressure threshold, the fingerprint image on the fingerprint region is acquired; and when the current pressure value is less than the pressure threshold, the fingerprint image on the fingerprint region is not acquired.

In addition, step 401 may be understood with reference to the above description of step 101; step 404 may be understood with reference to the above description of step 103; and further detail is omitted for brevity.

Based on the examples of FIGS. 2-4, the quality and the acquisition efficiency of the acquired fingerprint image can be further improved by determining whether the fingerprint image on the fingerprint region is acquired in combination with the pressure value for the touch operation.

In an example, on the basis of any of the above examples, the method of collecting fingerprints provided by the present disclosure may further include step 104.

At step 104, it is determined whether a touch adjustment prompt is output according to the acquired fingerprint image.

At step 104, determining whether a touch adjustment prompt is output according to the acquired fingerprint image includes the following sub-steps 1041-1042.

At sub-step 1041, the quality of the fingerprint image is analysed based on a particular parameter to obtain an analysis result.

At sub-step 1042, when the analysis result does not satisfy the preset condition, the touch adjustment prompt is output.

The sub-step 1041 is the same as the above sub-step 1031. The sub-step 1042 and the above sub-step 1032 are two situations based on the sub-step 1031. That is, according to the quality of the acquired fingerprint image, it may be simultaneously determined whether the the touch qualification prompt is output and the touch adjustment prompt is output. Based on the analysis result obtained in the above sub-step 1031, when the analysis result satisfies the preset condition, the touch qualification prompt is output; and when the analysis result does not satisfy the preset condition, the touch adjustment prompt is output.

In some examples, the step for outputting the touch adjustment prompt may include at least one of: playing a prompt animation, displaying text prompt information, and playing voice prompt information. How to play the prompt animation, how to display the text prompt information, how to play the voice prompt information may refer to the above corresponding description, and further detail is omitted for brevity.

In addition, based on any of playing the prompt animation, displaying the text prompt information, and playing the voice prompt information, a vibration prompt may be combined to obtain a better prompt effect.

In an example, sub-step 1042 further includes: adjusting a content of the touch adjustment prompt according to the analysis result.

In the following, taking the analysis result being a comprehensive quality score less than the qualified score threshold and the qualified score threshold being 70 as an example, how to adjust the content of the touch adjustment prompt according to the analysis result is briefly illustrated.

Figure 5:
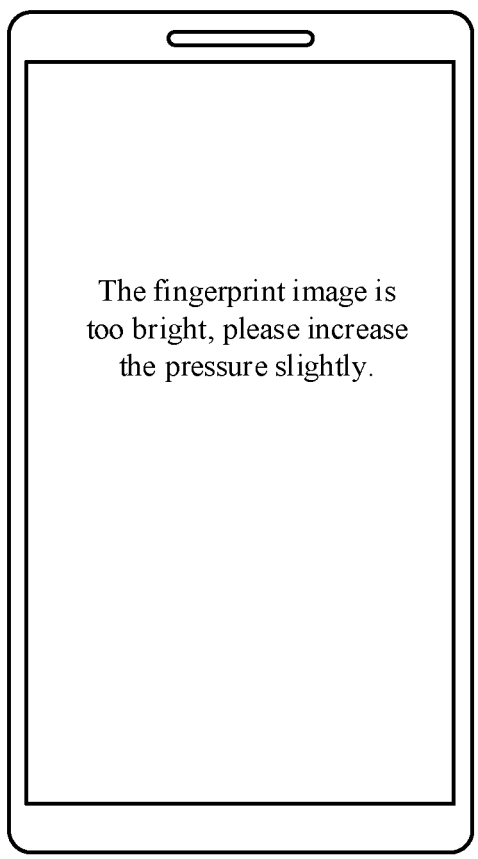
FIG. 5 is a schematic diagram of an interface of outputting a touch adjustment prompt by an electronic device according to an exemplary aspect of the present disclosure.
Figure 6:
FIG. 6 is a schematic diagram of an interface of outputting a touch adjustment prompt by an electronic device according to an exemplary aspect of the present disclosure.
Figure 7:
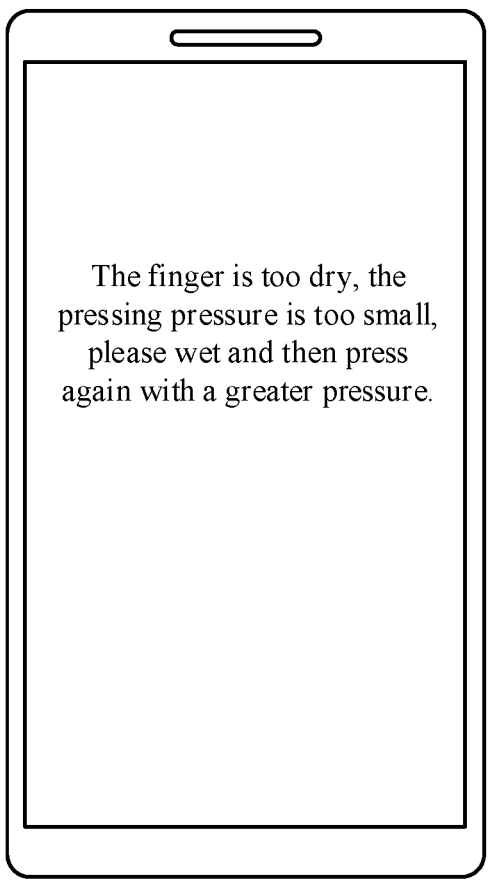
FIG. 7 is a schematic diagram of an interface of outputting a touch adjustment prompt by an electronic device according to an exemplary aspect of the present disclosure.

When the value of the analysis result is in a range [60, 70], the output content of the touch adjustment prompt may be: "The fingerprint image is too bright, please increase the pressure slightly." In this way, the user is prompted to increase the pressing pressure. FIG. 5 is a schematic diagram of an interface of outputting a touch adjustment prompt by an electronic device according to an example of the present disclosure. When the value of the analysis result is in a range [45, 60], the output content of the touch adjustment prompt may be: "The finger is too dry, please wet and press again." In this way, the user is prompted to wet the finger. FIG. 6 is a schematic diagram of an interface of outputting a touch adjustment prompt by an electronic device according to an example of the present disclosure. When the value of the analysis result is in a range [0, 45], the output content of the touch adjustment prompt may be: "The finger is too dry, the pressing pressure is too small, please wet and then press again with a greater pressure." In this way, the user is prompted to wet the finger and increase the pressing pressure. FIG. 7 is a schematic diagram of an interface of outputting a touch adjustment prompt by an electronic device according to an example of the present disclosure.

Therefore, in the present disclosure, the accuracy of the analysis result can be further improved by obtaining an analysis result based on the gray mean value, the gray variance, the effective region, and/or the singular point of the fingerprint image, and determining whether the touch adjustment prompt is output based on the analysis result; and the touch adjustment prompt is more targeted by adjusting the content of the touch adjustment prompt according to the analysis result. In this case, a relatively accurate touch adjustment prompt can be provided for the user according to the actual pressing condition of the user, which is beneficial to improving the adjustment efficiency of the touch operation and the fingerprint collection efficiency.

In an example, on the basis of any of the above examples, the method of collecting fingerprints provided by the present disclosure may further include step 104a.

At step 104a, when it is determined that the fingerprint image on the fingerprint region is acquired, the screen is controlled to enter the high brightness mode.

At step 104a, the high brightness mode may be abbreviated to HBM.

Therefore, in the present disclosure, the brightness when acquiring the fingerprint image is enhanced by controlling the screen to enter the high brightness mode when it is determined that the fingerprint image is acquired, thereby further improving the clarity of the acquired fingerprint image, increasing information included in the acquired fingerprint image, and improving the fingerprint collection efficiency.

Figure 8:
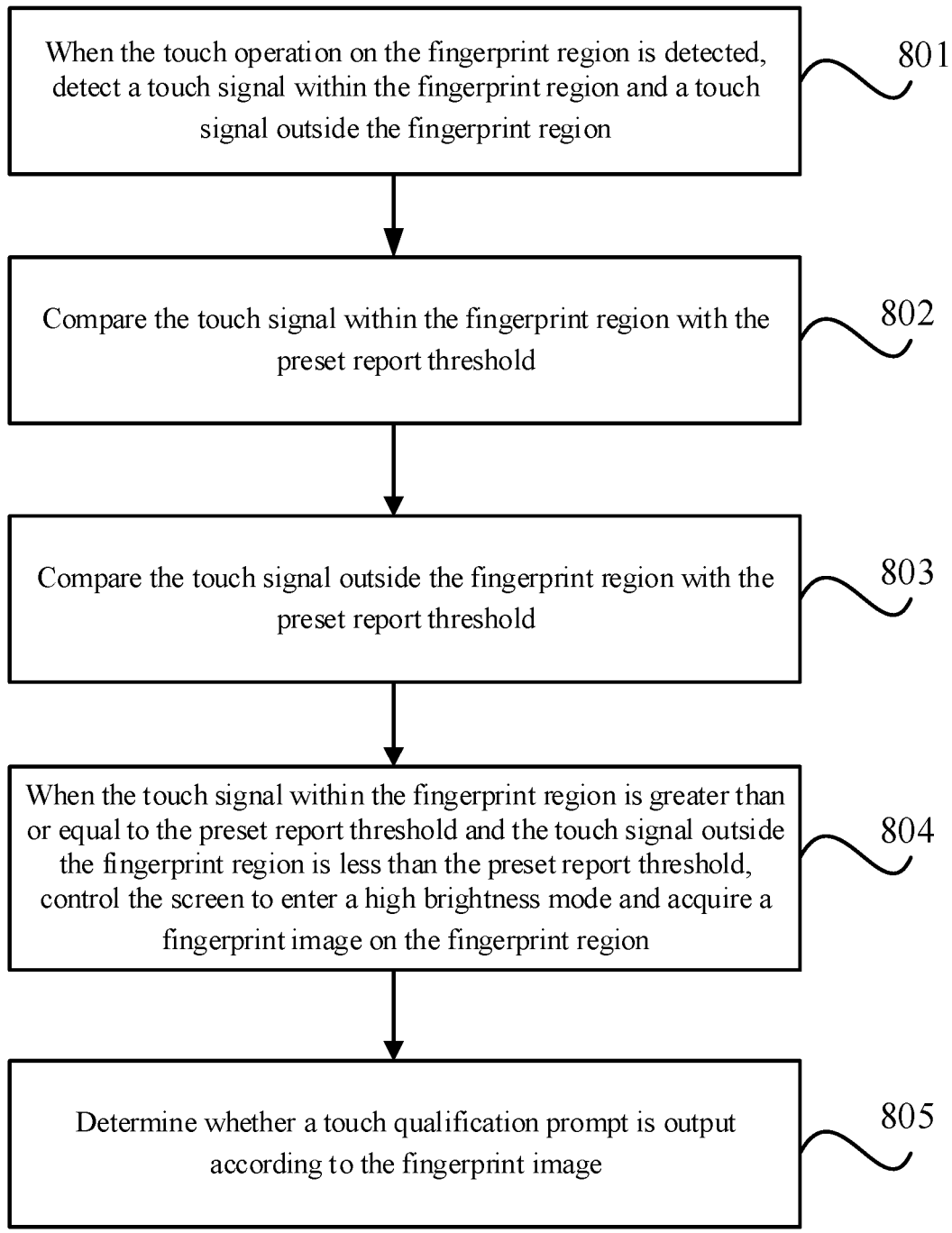
FIG. 8 is a flowchart of a method of collecting fingerprints according to an exemplary aspect of the present application.

FIG. 8 is a flowchart of a method of collecting fingerprints provided by an example of the present application. The method of collecting fingerprints shown in FIG. 8 is applied to an electronic device and includes the following steps 801-805.

At step 801, when the touch operation on the fingerprint region is detected, a touch signal within the fingerprint region and a touch signal outside the fingerprint region are detected.

At step 802, the touch signal within the fingerprint region is compared with the preset report threshold.

At step 803, the touch signal outside the fingerprint region is compared with the preset report threshold.

At step 804, when the touch signal within the fingerprint region is greater than or equal to the preset report threshold and the touch signal outside the fingerprint region is less than the preset report threshold, the screen is controlled to enter a high brightness mode and a fingerprint image on the fingerprint region is acquired.

At step 805, it is determined whether a touch qualification prompt is output according to the fingerprint image.

In the off-screen mode, when the touch operation on the fingerprint region is detected, the touch signal within the fingerprint region and the touch signal outside the fingerprint region are detected. The touch signal within the fingerprint region and the touch signal outside the fingerprint region are both detected by the touch detecting configuration, such as, a touch screen, of the electronic device. In an example, the touch signal within the fingerprint region is 500, the touch signal outside the fingerprint region is 100 and the preset report threshold is 200.

In an example, the touch signal outside the fingerprint region is less than the preset report threshold. That is, there is no or respectively slight touch operation outside the fingerprint region in the screen. Steps 801-805 may refer to steps 101-104, and the same portions will not be described again.

Therefore, in the method of collecting fingerprints shown in FIG. 8, the screen is controlled to light up, e.g. enter the HBM according to the touch signal within the fingerprint region and the touch signal outside the fingerprint region, thereby effectively preventing the screen from being lit up too frequently due to the false touch operation of the user, avoiding a screen burn-in phenomenon, or avoiding the energy consumption loss caused by a case that the screen is lit up due to the false touch operation of the user. If the screen is lit up by false touch operation of the user, the screen may be on in a respectively long time length and thus the screen burn-in phenomenon may occur.

Figure 9:
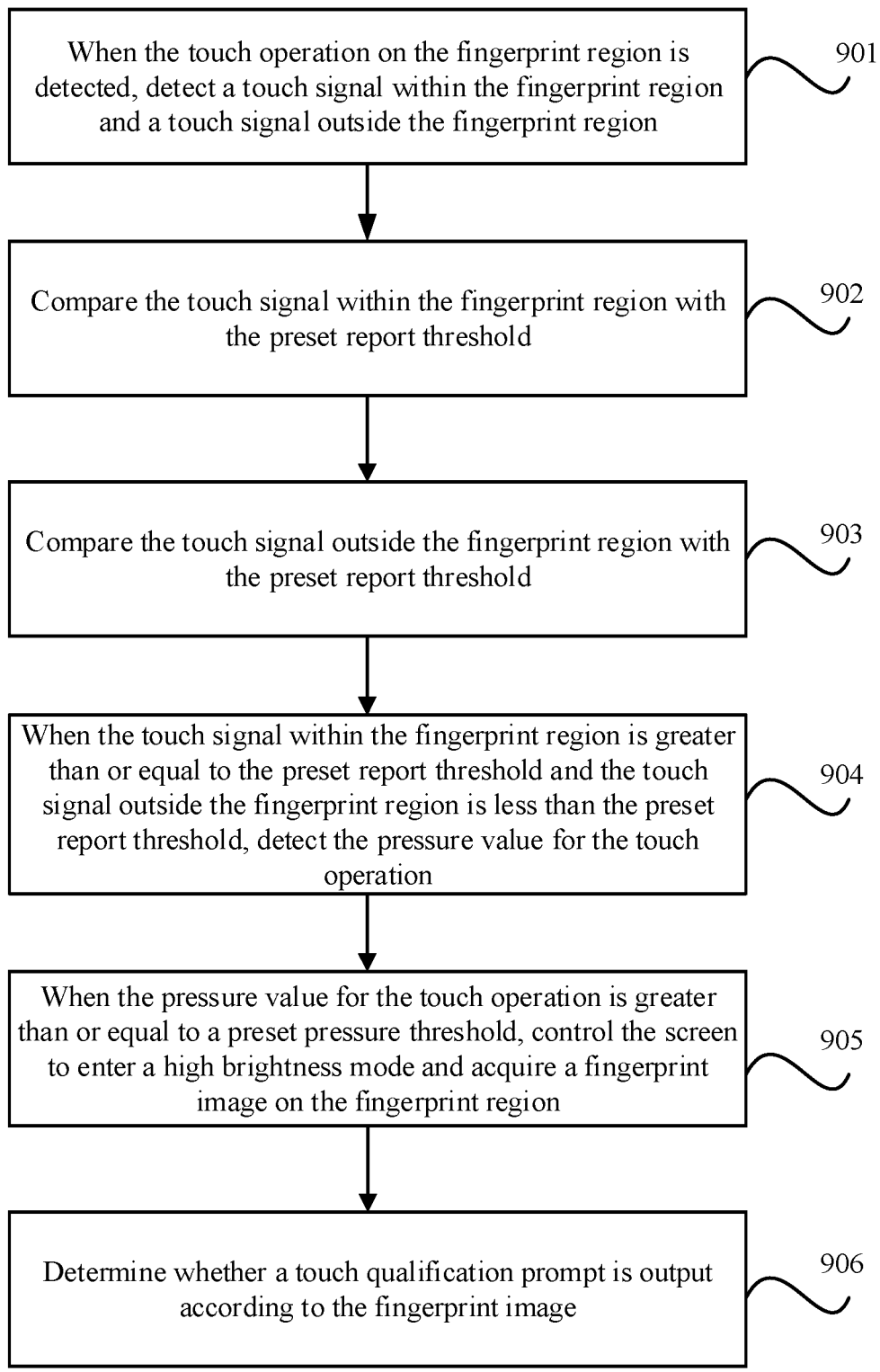
FIG. 9 is a flowchart of a method of collecting fingerprints according to an exemplary aspect of the present application.

FIG. 9 is a flowchart of a method of collecting fingerprints provided by an example of the present application. The method of collecting fingerprints shown in FIG. 9 is applied to an electronic device and includes the following steps 901-906.

At step 901, when the touch operation on the fingerprint region is detected, a touch signal within the fingerprint region and a touch signal outside the fingerprint region are detected.

At step 902, the touch signal within the fingerprint region is compared with the preset report threshold.

At step 903, the touch signal outside the fingerprint region is compared with the preset report threshold.

At step 904, when the touch signal within the fingerprint region is greater than or equal to the preset report threshold and the touch signal outside the fingerprint region is less than the preset report threshold, the pressure value for the touch operation is detected.

At step 905, when the pressure value for the touch operation is greater than or equal to a preset pressure threshold, the screen is controlled to enter a high brightness mode and a fingerprint image on the fingerprint region is acquired.

At step 906, it is determined whether a touch qualification prompt is output according to the fingerprint image.

Steps 901-906 may refer to the related descriptions of steps 101-104 and FIGS. 3, 4 and 8, and detail is not described herein again.

Therefore, in the method of collecting fingerprints shown in FIG. 9, the screen is controlled to light up, e.g. enter the HBM according to the touch signal within the fingerprint region, the touch signal outside the fingerprint region and the pressure value for the touch operation, thereby effectively preventing the screen from being lit up too frequently due to the false touch operation of the user, avoiding a screen burn-in phenomenon, or avoiding the energy consumption loss caused by a case that the screen is lit up due to the false touch operation of the user.

Figure 10:
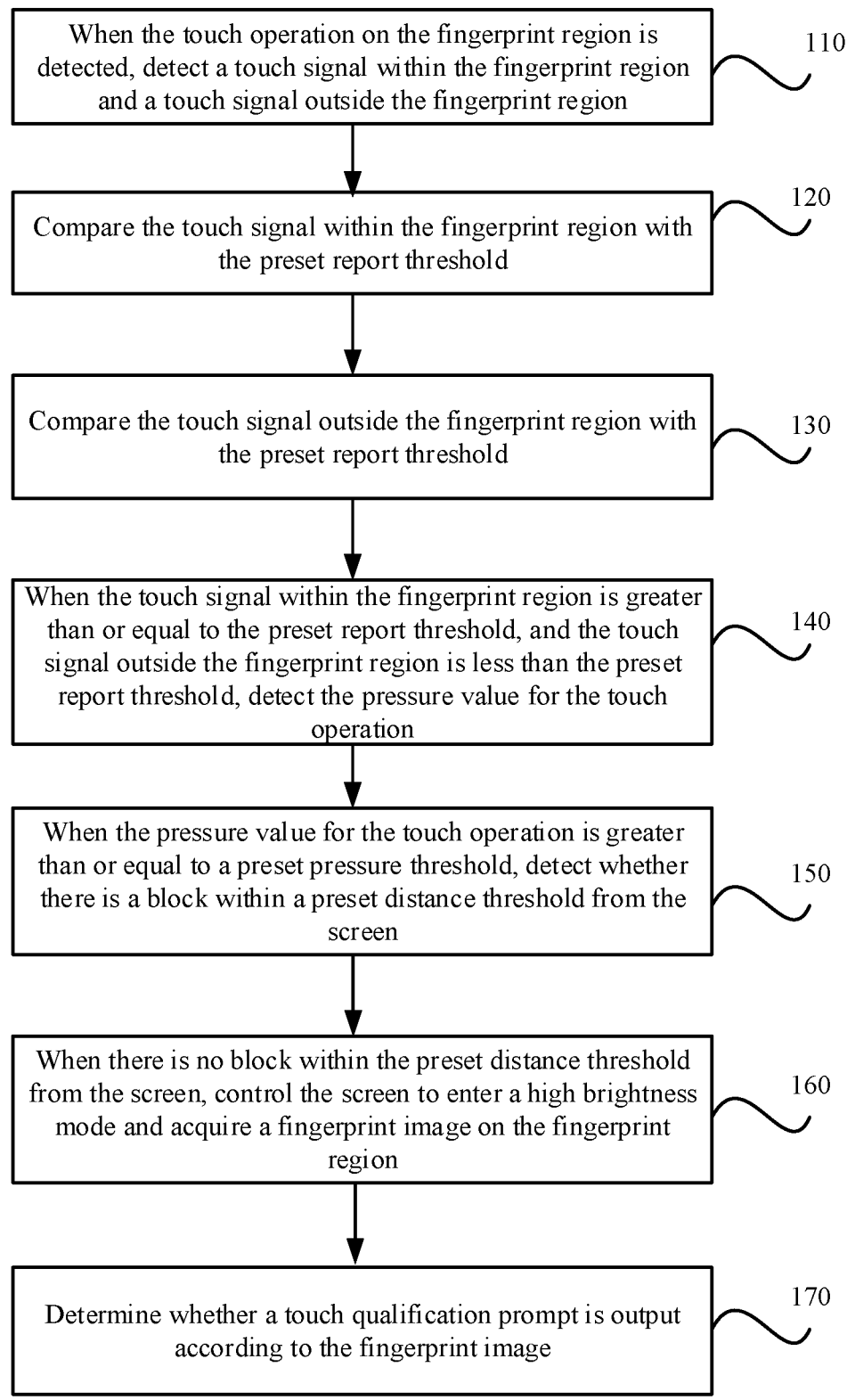
FIG. 10 is a flowchart of a method of collecting fingerprints according to an exemplary aspect of the present application.

FIG. 10 is a flowchart of a method of collecting fingerprints provided by an example of the present application. The method is applied to an electronic device and includes the following steps 110-170.

At step 110, when the touch operation on the fingerprint region is detected, a touch signal within the fingerprint region and a touch signal outside the fingerprint region are detected.

At step 120, the touch signal within the fingerprint region is compared with the preset report threshold.

At step 130, the touch signal outside the fingerprint region is compared with the preset report threshold.

At step 140, when the touch signal within the fingerprint region is greater than or equal to the preset report threshold, and the touch signal outside the fingerprint region is less than the preset report threshold, the pressure value for the touch operation is detected.

At step 150, when the pressure value for the touch operation is greater than or equal to a preset pressure threshold, it is detected whether there is a block within a preset distance threshold from the screen.

The presence or absence of a block within the distance threshold may be detected by a distance sensor (may also be referred to as P-sensor) in the electronic device. The distance threshold may be pre-set by the developer during the development phase or set by the user according to his own usage.

At step 160, when there is no block within the preset distance threshold from the screen, the screen is controlled to enter a high brightness mode and a fingerprint image on the fingerprint region is acquired.

At step 170, it is determined whether a touch qualification prompt is output according to the fingerprint image.

Steps 110-170 may refer to the related descriptions of the above steps 101-104, FIGS. 3, 4, 8, and 9, and detail is not described herein again.

Therefore, in the method of collecting fingerprints shown in FIG. 10, the screen is controlled to light up, e.g. enter the HBM according to the touch signal within the fingerprint region, the touch signal outside the fingerprint region, the pressure value for the touch operation and the presence or absence of a block within the distance threshold, thereby effectively preventing the screen from being lit up too frequently due to the false touch operation of the user, avoiding a screen burn-in phenomenon, or avoiding the energy consumption loss caused by a case that the screen is lit up due to the false touch operation of the user.

Figure 11:
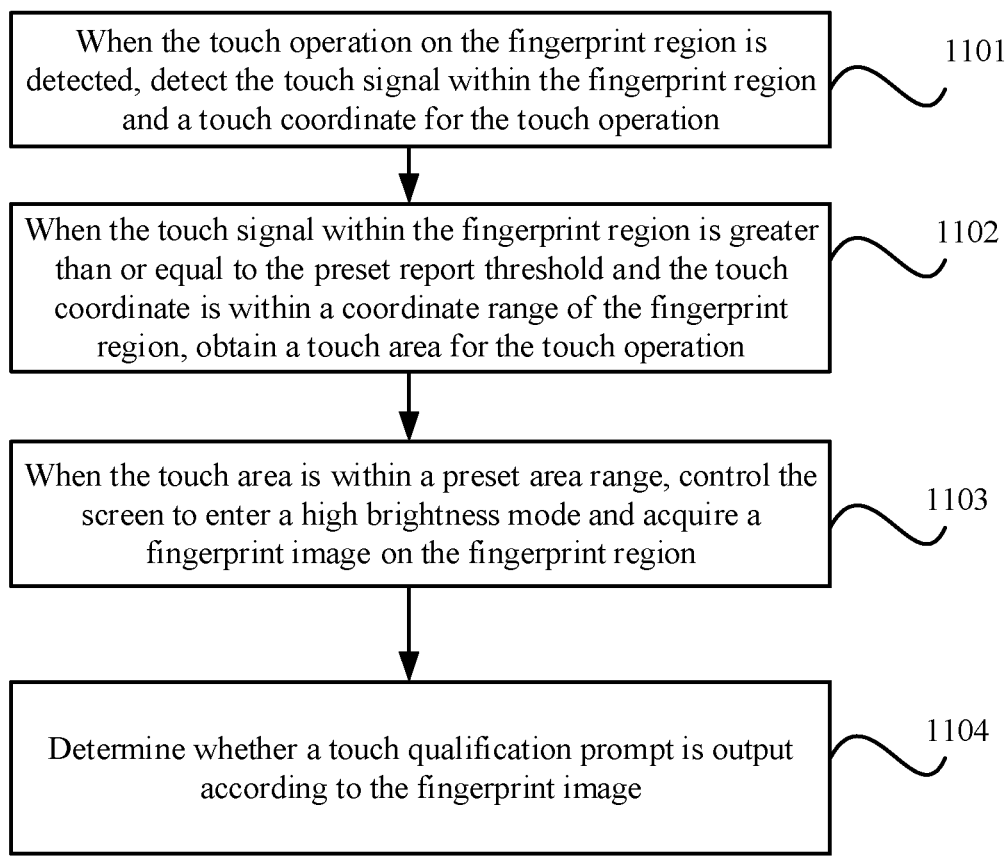
FIG. 11 is a flowchart of a method of collecting fingerprints according to an exemplary aspect of the present application.

FIG. 11 is a flowchart of a method of collecting fingerprints provided by an example of the present application. The method is applied to an electronic device and includes the following steps 1101-1104.

At step 1101, when the touch operation on the fingerprint region is detected, the touch signal within the fingerprint region and a touch coordinate for the touch operation are detected.

At step 1102, when the touch signal within the fingerprint region is greater than or equal to the preset report threshold and the touch coordinate is within a coordinate range of the fingerprint region, a touch area for the touch operation is obtained.

At step 1103, when the touch area is within a preset area range, the screen is controlled to enter a high brightness mode and a fingerprint image on the fingerprint region is acquired.

At step 1104, it is determined whether a touch qualification prompt is output according to the fingerprint image.

Steps 1101-1104 may refer to the above steps 101-104, and detail is not described herein again.

In an example, the touch coordinate for the touch operation may be obtained by a touch sensor in the electronic device in conjunction with a correlation function of a touch event stored in the electronic device. The fingerprint region in the screen corresponds to the fingerprint identification configuration of the electronic device. The coordinate range of the fingerprint region refers to a coordinate range in the screen associated with the fingerprint identification configuration. The coordinate range of the fingerprint region may be pre-set by the developer in the development stage and stored in the electronic device. The touch area may be detected by the touch sensor of the electronic device.

At step 1103, the preset area range is pre-set by the developer in the development stage and stored in the electronic device, which may be represented as a range (minimum area, maximum area). The touch area for the current touch operation is within the preset area range, that is, the touch area for the current touch operation is larger than the minimum area and smaller than the maximum area. To avoid a case that the electronic device responds to a false touch operation from a respectively small metal object, the touch area is larger than the minimum area. To avoid a case that electronic device responds to a false touch operation from other parts except the finger, such as the wrist of the human body.

Therefore, in the method of collecting fingerprints shown in FIG. 11, the screen is controlled to light up, e.g. enter the HBM according to the touch signal within the fingerprint region, the touch coordinate and touch area of the touch operation, thereby effectively preventing the screen from being lit up too frequently due to the false touch operation of the user, avoiding a screen burn-in phenomenon, or avoiding the energy consumption loss caused by a case that the screen is lit up due to the false touch operation of the user; and only the touch sensor is used to obtain the touch coordinate and the touch area and the screen is controlled to light up without using other sensors, which is beneficial to further reduce energy consumption and improve the fingerprint collection and fingerprint unlocking efficiency.

In an example, when the method of collecting fingerprints provided by the present disclosure is applied to a fingerprint unlocking scenario or a fingerprint payment scenario, the method may further include the following steps 106-107.

At step 106, the acquired fingerprint image is identified to obtain an identification result.

At step 107, it is determined whether an unlocking operation and/or a payment operation is performed according to the identification result.

At step 106, the identification result of the fingerprint image may be obtained by the fingerprint identification configuration in the electronic device. The fingerprint identification configuration, such as an in-display fingerprint identification configuration, is used to identify the fingerprint image to obtain the identification result.

At step 107, in an example, when the identification result indicates that the fingerprint identification is successful and the pressure value for the touch operation is less than the preset payment pressure threshold, the unlocking operation is performed; or when the fingerprint identification is successful, and the pressure of the touch operation is performed When the value is greater than or equal to the preset payment pressure threshold, the payment operation is performed, or the unlocking and payment operations are simultaneously performed.

In some examples, step 106 may include the following sub-steps 1061-1062.

At sub-step 1061, a pre-stored fingerprint database is called.

At sub-step 1062, it is determined whether the currently acquired fingerprint image matches a reference fingerprint image in the pre-stored fingerprint database; if yes, an identification result indicating that the fingerprint identification is successful is output; and if no, an identification result indicating that the fingerprint identification fails is output.

In some examples, step 107 includes the following sub-steps.

At sub-step 1071, when the identification result indicates that the fingerprint identification is successful, a first control for unlocking and a second control for payment are displayed.

At sub-step 1072, when a first instruction generated by the first control is detected, the screen is unlocked.

At sub-step 1073, when a second instruction generated by the second control is detected, the screen is unlocked and the payment operation is performed, or the screen is kept locked and the payment operation is performed.

After the user clicks the first control, the first control is triggered and accordingly the first instruction is generated. After the user clicks the second control, the second control is triggered and accordingly the second instruction is generated.

In some examples, at sub-step 1071, the display content of the first control in the screen may be "unlock," and the display content of the second control in the screen may be "pay."

Thus, with the method of collecting fingerprints provided by the present disclosure, the fingerprint unlocking efficiency and the fingerprint payment efficiency are improved, and the unlocking operation and the payment operation are more convenient; and the unlocking operation and the payment operation are distinguished by using the first control and the second control when the identification result indicates that the fingerprint identification is successful, which is beneficial to reducing the complexity of the algorithmic for distinguishing the unlocking operation and the payment operation, and increasing the response speed of the electronic device to the unlocking operation or the payment operation.

In some examples, step 107 may not include sub-steps 1071 to 1073, but directly determine whether the unlocking operation and/or the payment operation are performed according to the identification result. In this case, the above step 201 and the above-step 202 need to be adaptively adjusted, and step 200 is added before step 201. Where, at step 202, the pressure threshold includes an unlocking pressure threshold for triggering the unlocking operation and triggering an instruction for acquiring the fingerprint image combined with the touch signal, and a payment pressure threshold for triggering the payment operation and triggering an instruction for acquiring the fingerprint image combined with the touch signal. The above step 201 is adjusted to step 201', and the above step 202 is adjusted to step 202'. The steps 200, 201' and 202' are as follows.

At step 200, the first control for unlocking and the second control for payment are displayed, and an instruction generated by clicking the first control or the second control is received.

At step 201', a pressure value for the touch operation is detected.

At step 202', when the instruction is generated by the first control, the pressure value is compared with the unlocking pressure threshold; and when the instruction is generated by the second control, the pressure value is compared with the payment pressure threshold.

In some examples, the unlocking operation and the payment operation may be distinguished, for example, by a voice prompt and a voice acquisition instruction, rather than the first control or the second control. That is, sub-step 1071 may be replaced with "when the identification result indicates that the fingerprint identification is successful, a voice prompt for triggering the generation of an unlocking instruction or a payment instruction is output." The content of the voice prompt may be "Will you need to unlock or pay?" is output. The above sub-step 1072 may be replaced with "the screen is unlocked when the unlocking instruction is obtained according to an answer." The above sub-step 1073 may be replaced with "the screen is unlocked and the payment operation is performed, or the screen is kept locked and the payment operation is performed when the payment instruction is obtained according to the answer."

In this case, the above step 200 may be replaced with "a voice prompt for triggering the generation of an unlocking instruction or a payment instruction is output." The above step 202' is replaced with "the pressure value is compared with the unlocking pressure threshold when an unlocking instruction is obtained according to the answer; and the pressure value is compared with the payment pressure threshold when a payment instruction is obtained according to the answer."

Where, when the user verbally answers "pay" or "unlock," a corresponding instruction is generated according to the received voice answer, that is, if the answer is "pay," the payment instruction is generated; and if the answer is "unlock," the unlocking instruction is generated.

Figure 12:
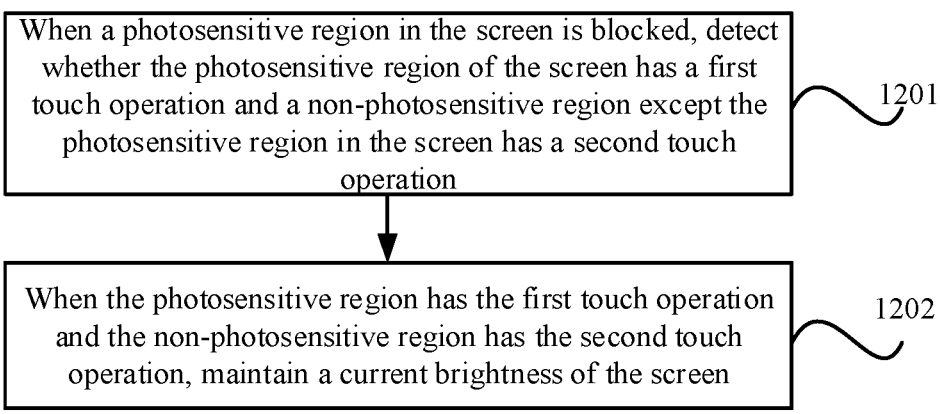
FIG. 12 is flowchart of a method of adjusting a screen brightness according to an exemplary aspect of the present disclosure.

A method of adjusting a screen brightness is further provided by examples of the present disclosure. The method of adjusting a screen brightness may be applied in an electronic device. FIG. 12 is flowchart of a method of adjusting a screen brightness according to an example of the present disclosure. As shown in FIG. 12, the method includes the following steps 1201-1202.

At step 1201, when a photosensitive region in the screen is blocked, it is detected whether the photosensitive region of the screen has a first touch operation and a non-photosensitive region except the photosensitive region in the screen has a second touch operation.

At step 1202, when the photosensitive region has the first touch operation and the non-photosensitive region has the second touch operation, a current brightness of the screen is maintained.

In some examples, at step 1201, whether the photosensitive region in the screen is blocked may be detected by the photosensitive sensor of the electronic device. The photosensitive region refers to a region in the screen corresponding to the photosensitive sensor, and the range of the photosensitive region is the same as a detection range of the photosensitive sensor. The touch operation may be detected by the touch sensor of the electronic device.

In some example, at step 1202, the current brightness refers to a brightness of the screen immediately before the photosensitive region in the screen is to be blocked, that is, when the photosensitive region in the screen is unblocked.

Therefore, in the method of adjusting a screen brightness shown in FIG. 12, when the photosensitive region in the screen is blocked, the brightness of the screen is not adjusted firstly, but it is firstly detected whether the photosensitive region of the screen has a first touch operation and the non-photosensitive region in the screen has a second touch operation, so as to adjust the brightness of the screen according to the detection result. In this way, when the brightness of the ambient light is unchanged, a phenomenon that the brightness of the screen changes due to the block of the photosensitive sensor is effectively avoided, thereby effectively preventing the brightness from being mis-adjusted, improving the brightness adjustment accuracy of the screen, and avoiding the energy consumption loss due to the adjustment of the brightness of the screen. Moreover, when the user plays a game, the photosensitive region is blocked due to the need to hold the electronic device horizontally, but by the method of the present disclosure, in this case, the brightness of the screen does not become dark, but the brightness of the screen before the photosensitive region is blocked is maintained. Therefore, the method of adjusting a screen brightness shown in FIG. 12 effectively optimizes the user experience.

In an example, step 1202 may include the following sub-steps 12021-12022.

At sub-step 12021, when the photosensitive region has the first touch operation and the non-photosensitive region has the second touch operation, a first touch signal for the first touch operation on the photosensitive region is compared with a preset first signal threshold, and a second touch signal for the second touch operation on the non-photosensitive region is compared with a preset second signal threshold.

At sub-step 12022, the current brightness of the screen is maintained when the first touch signal is greater than or equal to the first signal threshold and the second touch signal is greater than or equal to the second signal threshold.

In some examples, at sub-step 12021, the first touch signal may refer to a touch signal of the photosensitive region, the second touch signal may refer to a touch signal of the non-photosensitive region, the first signal threshold may refer to the preset report threshold, and the second signal threshold may refer to the preset report threshold. The first signal threshold, the second signal threshold and the preset report threshold are not necessarily the same. The first signal threshold, the second signal threshold and the preset report threshold are set according to the actual usage of the user.

In an example, in step 1202 or sub-step 12022, in addition to maintaining the current brightness of the screen, the method further includes: increasing a brightness adjustment start threshold. The brightness adjustment start threshold refers to a difference of change of the ambient light intensity detected by the photosensitive sensor. For example, the ambient light intensity detected at the last moment is A1, and the ambient light intensity detected at the next moment is A2. When the difference between A2 and A1 has to be greater than or equal to the brightness adjustment start threshold, the screen brightness automatic adjustment function of the electronic device is started, and the brightness of the screen is adjusted.

Therefore, a step of increasing a brightness adjustment start threshold is added in the method of adjusting a screen brightness shown in FIG. 12, which is beneficial to further preventing the screen brightness from being mis-adjusted when the photosensitive region is blocked and the ambient light intensity is unchanged. In addition, the screen brightness mis-adjustment due to the erroneous detection of the change of the ambient light intensity when the photosensitive region is blocked can be avoided to some extent. Therefore, an effect of preventing the screen brightness mis-adjustment is better.

In an example, the method of adjusting a screen brightness provided by the present disclosure may further include the following step 1203.

At step 1203, when the first touch signal is smaller than the first signal threshold, or the second touch signal is smaller than the second signal threshold, the current brightness of the screen is adjusted according to a currently detected ambient light intensity signal.

In an example, the method of adjusting a screen brightness provided by the present disclosure may be combined with the method of collecting fingerprints and/or the method of identifying fingerprints in any of the above examples, to improve the collection quality of the fingerprint image, the fingerprint collection efficiency and the fingerprint identification efficiency while achieving the purpose of screen brightness adjustment. For the details of how to combine, those skilled in the art may understand according to the technical solutions described in the disclosure, and detail is not described herein again.

Corresponding to above examples of the methods of collecting fingerprints, the present disclosure further provides an apparatus for collecting fingerprints. The apparatus incudes a detecting module, a comparison determining module and a touch qualification prompt module.

The detecting module is configured to detect a touch signal within the fingerprint region as a first touch signal when a touch operation on a fingerprint region is detected.

The comparison determining module includes a report comparison sub-module and a determining sub-module.

The report comparison sub-module is configured to compare the first touch signal with a preset report threshold to obtain a first comparison result.

The determining sub-module is configured to determine whether a fingerprint image on the fingerprint region is acquired according to the first comparison result.

The touch qualification prompt module is configured to determine whether a touch qualification prompt is output according to the fingerprint image.

In some examples, the detecting module is further configured to detect a pressure value for the touch operation or determine whether the pressure value for touch operation is detected according to the first comparison result. The comparison determining module further includes a pressure comparison sub-module, configured to compare the pressure value with a preset pressure threshold to obtain a second comparison result. The determining sub-module is further configured to determine whether the fingerprint image on the fingerprint region is acquired according to the first comparison result and the second comparison result.

In some examples, the touch qualification prompt module includes an analysis sub-module and a prompt sub-module.

The analysis sub-module is configured to analyze a quality of the fingerprint image based on a particular parameter to obtain an analysis result; wherein the particular parameter includes one or more of a gray mean value, a gray variance, an effective area, and a singular point of the fingerprint image.

The prompt sub-module is configured to output the touch qualification prompt when the analysis result satisfies a preset condition.

In some examples, the touch qualification prompt module further includes a touch adjustment prompt sub-module.

The touch adjustment prompt sub-module is configured to output a touch adjustment prompt when the analysis result does not satisfy the preset condition, and adjust the touch adjustment prompt based on the analysis result.

In some examples, the apparatus further includes a screen controlling module.

The screen controlling module is configured to control a screen to enter a high brightness mode when it is determined that the fingerprint image on the fingerprint region is acquired.

In some examples, the prompt sub-module in the touch qualification prompt module or the touch adjustment prompt sub-module includes at least one of:

an animation prompt sub-module, configured to play a prompt animation;

a text prompt sub-module, configured to display text prompt information;

a voice prompt sub-module, configured to play voice prompt information; and a vibration prompt sub-module, configured to output a vibration prompt.

In some examples, the apparatus further includes:

a fingerprint identification module, configured to identify the fingerprint image to obtain an identification result; and a fingerprint unlocking and payment module, configured to determine whether an unlocking operation and/or a payment operation is performed according to the identification result.

In some examples, the fingerprint unlocking and payment module is configured to display a first control and a second control when the identification result indicates a successful match; unlock a screen when a first instruction generated by the first control is detected, and unlock the screen and perform the payment operation or keep the screen locked and perform the payment operation when a second instruction generated by the second control is detected.

In some examples, the detecting module is further configured to detect a touch signal outside the fingerprint region as a second touch signal when the touch operation on the fingerprint region is detected; compare the second touch signal with the preset report threshold; control a screen to enter a high brightness mode when the first touch signal is greater than or equal to the preset report threshold and the second touch signal is less than the preset report threshold; and acquire the fingerprint image on the fingerprint region.

In some examples, when the first touch signal is greater than or equal to the preset report threshold and the second touch signal is less than the preset report threshold, controlling the screen to enter the high brightness mode includes: detecting a pressure value for the touch operation; and when the pressure value is greater than or equal to a preset pressure threshold, controlling the screen to enter the high brightness mode.

In some examples, when the pressure value is greater than or equal to a preset pressure threshold, controlling the screen to enter the high brightness mode includes: detecting whether there is a block within a preset distance threshold from the screen; and when there is no block within the preset distance threshold from the screen, controlling the screen to enter the high brightness mode.

In some examples, the detecting module is further configured to: when the touch operation on the fingerprint region is detected, detect a touch coordinate for the touch operation; when the first touch signal is greater than or equal to the preset report threshold and the touch coordinate are within a coordinate range of the fingerprint region, obtain a touch area for the touch operation; when the touch area is within a preset area range, control a screen to enter a high brightness mode; and acquire the fingerprint image on the fingerprint region.

Since each module in the apparatus of the present disclosure corresponds to the foregoing method of collecting fingerprints, the apparatus of the present disclosure may be described with reference to the foregoing method of collecting fingerprints, and detail is not described herein.

Corresponding to the above examples of the methods of collecting fingerprints, the present disclosure further provides an electronic device. The electronic device includes a memory, a processor and a computer program stored on the memory and executable on the processor. Where when the processor executes the computer program, the above method of collecting fingerprints is realized.

Figure 13:
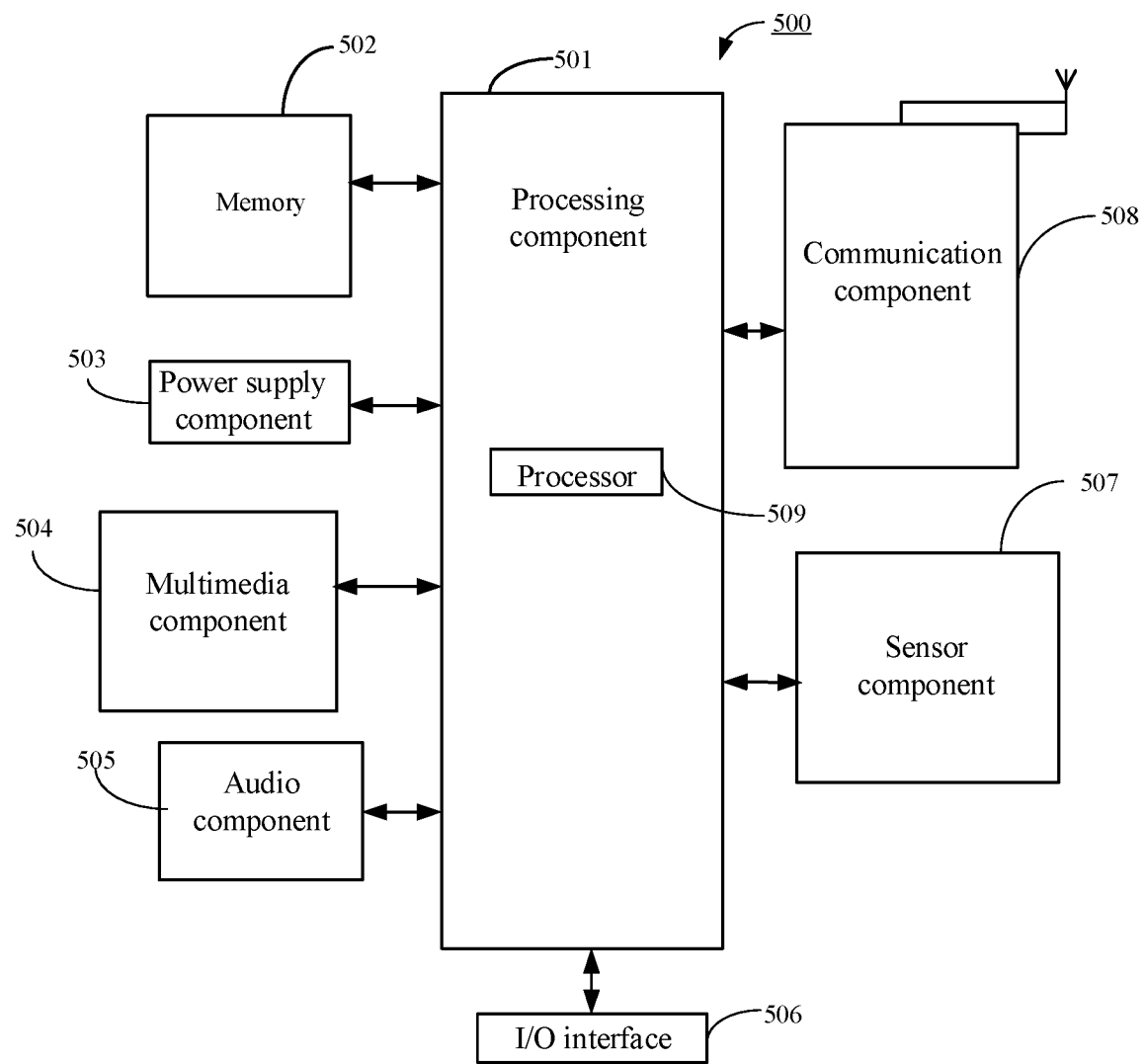
FIG. 13 is a block diagram of an electronic device according to an exemplary aspect of the present disclosure.

FIG. 13 is a block diagram of an electronic device according to an example of the present disclosure. The electronic device 500 may be a terminal device such as a mobile phone, a computer, a digital broadcasting terminal, a message transceiver, a game console, a tablet device, a medical device, a fitness facility, a personal digital assistant and so on.

Referring to FIG. 13, the electronic device 500 may include one or more of the following components: a processing component 501, a memory 502, a power supply component 503, a multimedia component 504, an audio component 505, an input/output (I/O) interface 506, a sensor component 507, and a communication component 508.

The processing component 501 generally controls overall operations of the electronic device 500, such as operations associated with display, phone calls, data communications, camera operations, and recording operations. The processing component 501 may include one or more processors 509 to execute instructions to complete all or part of the steps of the above methods. In addition, the processing component 501 may include one or more modules which facilitate the interaction between the processing component 501 and other components. For example, the processing component 501 may include a multimedia module to facilitate the interaction between the multimedia component 504 and the processing component 501.

The memory 502 is configured to store various types of data to support the operation of the electronic device 500. Examples of such data include instructions for any application or method operated on the electronic device 500, contact data, phonebook data, messages, pictures, videos, and so on. The memory 502 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power supply component 503 provides power to different components of the electronic device 500. The power supply component 503 may include a power management system, one or more power supplies, and other components associated with generating, managing, and distributing power for the electronic device 500.

The multimedia component 504 includes a screen providing an output interface between the electronic device 500 and a user. In some examples, the screen may include a Touch Panel (TP), which is implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 504 may include a front camera and/or a rear camera. The front camera and/or rear camera may receive external multimedia data when the electronic device 500 is in an operating mode, such as a photographing mode or a video mode. Each of the front camera and the rear camera may be a fixed optical lens system or have focal length and optical zooming capability.

The audio component 505 is configured to output and/or input an audio signal. For example, the audio component 505 includes a microphone (MIC). When the electronic device 500 is in an operating mode, such as a call mode, a recording mode, and a voice recognition mode, the MIC is configured to receive an external audio signal. The received audio signal may be further stored in the memory 502 or sent via the communication component 508. In some examples, the audio component 505 further includes a speaker to output an audio signal.

The I/O interface 506 may provide an interface between the processing component 501 and peripheral interface modules. The above peripheral interface modules may include a keyboard, a click wheel, buttons and so on. These buttons may include, but are not limited to, a home button, a volume button, a starting button and a locking button.

The sensor component 507 includes one or more sensors to provide status assessments of various aspects for the electronic device 500. For example, the sensor component 507 may detect the on/off status of the electronic device 500, and relative positioning of component, for example, the component is a display and a keypad of the electronic device 500. The sensor component 507 may also detect a change in position of the electronic device 500 or a component of the electronic device 500, a presence or absence of the contact between a user and the electronic device 500, an orientation or an acceleration/deceleration of the electronic device 500, and a change in temperature of the electronic device 500. The sensor component 507 may include a proximity sensor to detect the presence of a nearby object without any physical contact. The sensor component 507 may further include an optical sensor, such as a Complementary Metal-Oxide-Semiconductor (CMOS) or Charged Coupled Device (CCD) image sensor which is used in imaging applications. In some examples, the sensor component 507 may further include an acceleration sensor, a gyroscope sensor, a magnetic sensor, a pressure sensor, or a temperature sensor.

The communication component 508 is configured to facilitate wired or wireless communication between the electronic device 500 and other devices. The electronic device 500 may access a wireless network that is based on a communication standard, such as Wi-Fi, 2G, 3G, 4G or 5G, or a combination thereof. In an example, the communication component 508 receives a broadcast signal or broadcast-associated information from an external broadcast management system via a broadcast channel. In an example, the communication component 508 further includes a Near Field Communication (NFC) module to facilitate short-range communications. For example, the NFC module may be implemented based on a Radio Frequency Identification (RFID) technology, an Infrared Data Association (IrDA) technology, an Ultra Wideband (UWB) technology, a Bluetooth® (BT) technology and other technologies.

In an example, the electronic device 500 may be implemented by one or more Application Specific Integrated Circuits (ASIC), Digital Signal Processors (DSP), Digital Signal Processing Devices (DSPD), programmable Logic Devices (PLD), Field Programmable Gate Arrays (FPGA), controllers, microcontrollers, microprocessors, or other electronic components for performing the above method of collecting fingerprints.

The implementation of the functions and effects of each module in the above apparatus may refer to the implementation of the corresponding steps in the foregoing method, and detail is not described herein again.

For the apparatus example, since it corresponds substantially to the method example, the relevant parts may refer to the part of the method example. The apparatus example described above is merely illustrative, where the modules described as the separate component may or may not be physically separate, and the component shown as a module may or may not be a physical unit, i.e., may be located in one place or may be distributed to a plurality of network elements. A part or all of the modules may be selected according to the actual needs to achieve the purpose of the solution of the present disclosure. Those skilled in the art will understand and practice it without making creative work.

Corresponding to the examples of the method of collecting fingerprints, the present disclosure further provides a non-transitory computer readable storage medium storing a computer program, where the computer program is executable by the processor 509 of the electronic device to implement the method of collecting fingerprints.

The present disclosure may take the form of a computer program product which is implemented on one or more storage media (including but not limited to disk storage, CD-ROM, optical storage, etc.) including program codes. The computer readable storage medium includes both permanent and non-persistent, removable and non-removable media, and information storage may be implemented by any method or technology. The information can be computer readable instructions, data structures, modules of programs, or other data. Examples of computer storage media include, but are not limited to, phase-change memory (PRAM), static random access memory (SRAM), dynamic random access memory (DRAM), other types of random access memory (RAM), read only memory (ROM), electrically erasable programmable read only memory (EEPROM), flash memory or other memory technology, compact disk read only memory (CD-ROM), digital versatile disk (DVD) or other optical storage, cassette tape, magnetic disk storage or other magnetic memories or any other non-transportable media that can be used to store information that can be accessed by computing devices.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the art that are not disclosed in the present disclosure. The specification and examples are considered as exemplary only, with a true scope and spirit of the present disclosure being indicated by the following claims.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

It is to be understood that the present disclosure is not limited to the precise structure described above and shown in the accompanying drawings, and that various modifications and changes may be made without departing from the scope thereof. The scope of the present disclosure is limited only by the appended claims.

The above description is only preferred examples of the present disclosure, and is not intended to limit the disclosure, and any modifications, equivalents, improvements, etc., which are made within the spirit and principles of the present disclosure, should be included scope of the present disclosure.

What is claimed is:

1. A method of collecting fingerprints, comprising:
    detecting a touch operation on a fingerprint region in a screen of an electronic device;
    when the touch operation on the fingerprint region is detected, detecting a touch signal within the fingerprint region as a first touch signal and detecting a touch signal outside the fingerprint region within the screen as a second touch signal;
    in response to determining that the first touch signal is greater than or equal to a preset report threshold and the second touch signal is less than the preset report threshold, controlling the screen to enter a high brightness mode and acquiring a fingerprint image on the fingerprint region;
    analyzing the fingerprint image to obtain an analysis result; and
    outputting a prompt based on the analysis result.

2. The method of claim 1, wherein analyzing the fingerprint image comprises analyzing a quality of the fingerprint image based on a parameter to obtain the analysis result, wherein the parameter includes one or more of a gray mean value, a gray variance, an effective area, and a singular point of the fingerprint image; and
    wherein outputting the prompt comprises outputting a touch qualification prompt when the analysis result satisfies a preset condition.

3. The method of claim 2, wherein outputting the prompt comprises outputting a touch adjustment prompt when the analysis result does not satisfy the preset condition; and
    receiving an adjusted touch operation on the fingerprint region based on the touch adjustment prompt.

4. The method of claim 1, wherein outputting the prompt comprises at least one of playing a prompt animation, displaying text prompt information, playing voice prompt information, and outputting a vibration prompt.

5. The method of claim 1, further comprising:
    identifying the fingerprint image to obtain an identification result; and
    initiating at least one of an unlocking operation and a payment operation based on the identification result.

6. The method of claim 5, wherein initiating at least one of the unlocking operation and the payment operation based on the identification result comprises:
    when the identification result indicates a successful match, displaying a first control and a second control;

when a first instruction generated by the first control is detected, unlocking a screen, wherein the fingerprint region is included in the screen; and when a second instruction generated by the second control is detected:

unlocking the screen and performing the payment operation, or keeping the screen locked and performing the payment operation.

7. The method of claim 1, wherein when the first touch signal is greater than or equal to the preset report threshold and the second touch signal is less than the preset report threshold, controlling the screen to enter the high brightness mode comprises:

detecting a pressure value for the touch operation; and when the pressure value is greater than or equal to a preset pressure threshold, controlling the screen to enter the high brightness mode.

8. The method of claim 7, wherein when the pressure value is greater than or equal to the preset pressure threshold, controlling the screen to enter the high brightness mode comprises:

detecting whether there is a block within a preset distance threshold from the screen; and when there is no block within the preset distance threshold from the screen, controlling the screen to enter the high brightness mode.

9. The method of claim 1, further comprising:

when the touch operation on the fingerprint region is detected, detecting a touch coordinate for the touch operation;

when the first touch signal is greater than or equal to the preset report threshold, the second touch signal is less than the preset report threshold, and the touch coordinate is within a coordinate range of the fingerprint region, obtaining a touch area for the touch operation;

when the touch area is within a preset area range:

controlling the screen to enter a high brightness mode; and acquiring the fingerprint image on the fingerprint region.

10. An electronic device, comprising:

a processor;

a memory for storing instructions executable by the processor, wherein the processor is configured to:

detect a touch operation on a fingerprint region in a screen of the electronic device;

when the touch operation on the fingerprint region is detected, detect a touch signal within the fingerprint region as a first touch signal and detect a touch signal outside the fingerprint region within the screen as a second touch signal;

in response to determining that the first touch signal is greater than or equal to a preset report threshold and the second touch signal is less than the preset report threshold, control the screen to enter a high brightness mode and acquire a fingerprint image on the fingerprint region;

analyze the fingerprint image to obtain an analysis result; and output a prompt based on the analysis result.

11. The electronic device of claim 10, wherein, when analyzing the fingerprint image, the processor is further configured to analyze a quality of the fingerprint image based on a parameter to obtain the analysis result, wherein the parameter includes one or more of a gray mean value, a gray variance, an effective area, and a singular point of the fingerprint image; and wherein, when outputting the prompt, the processor is further configured to output a touch qualification prompt when the analysis result satisfies a preset condition.

12. The electronic device of claim 11, wherein, when outputting the prompt, the processor is further configured to output a touch adjustment prompt when the analysis result does not satisfy the preset condition; and wherein the processor is further configured to receive an adjusted touch operation on the fingerprint region based on the touch adjustment prompt.

13. The electronic device of claim 12, wherein, when outputting the prompt, the processor is further configured to output the prompt comprising at least one of playing a prompt animation, displaying text prompt information, playing voice prompt information, and outputting a vibration prompt.

14. A non-transitory computer-readable storage medium storing instructions that, when executed by one or more processors of a device, cause the device to:

detect a touch operation on a fingerprint region in a screen of the device;

when the touch operation on the fingerprint region is detected, detect a touch signal within the fingerprint region as a first touch signal and detect a touch signal outside the fingerprint region within the screen as a second touch signal;

in response to determining that the first touch signal is greater than or equal to a preset report threshold and the second touch signal is less than the preset report threshold, control the screen to enter a high brightness mode and acquire a fingerprint image on the fingerprint region;

analyze the fingerprint image to obtain an analysis result; and output a prompt based on the analysis result.

* * * * *

UNITED STATES PATENT AND TRADEMARK OFFICE
CERTIFICATE OF CORRECTION

PATENT NO. : 10,956,706 B2  
APPLICATION NO. : 16/420240  
DATED : March 23, 2021  
INVENTOR(S) : Di Wang et al.

Page 1 of 1

It is certified that error appears in the above-identified patent and that said Letters Patent is hereby corrected as shown below:

On the Title Page

Item (54), and in the Specification, Column 1, Line 1, please change the title from "COLLECTING FINGREPRINTS" to --COLLECTING FINGERPRINTS--.

Signed and Sealed this  
First Day of July, 2025

Coke Morgan Stewart  
*Acting Director of the United States Patent and Trademark Office*